(12) United States Patent
Palanca et al.

(10) Patent No.: US 6,889,291 B1
(45) Date of Patent: May 3, 2005

(54) METHOD AND APPARATUS FOR CACHE REPLACEMENT FOR A MULTIPLE VARIABLE-WAY ASSOCIATIVE CACHE

(75) Inventors: Salvador Palanca, Gold River, CA (US); Subramaniam Maiyuran, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 494 days.

(21) Appl. No.: 09/608,507

(22) Filed: Jun. 30, 2000

(51) Int. Cl.[7] .............................................. G06F 12/00
(52) U.S. Cl. ...................... 711/128; 711/118; 711/129; 711/136
(58) Field of Search ................................. 711/100, 118, 711/129, 136, 144, 154, 119, 134, 127, 128, 133

(56) References Cited

U.S. PATENT DOCUMENTS

| | | | | |
|---|---|---|---|---|
| 5,278,964 A | * | 1/1994 | Mathews et al. | |
| 5,559,952 A | * | 9/1996 | Fujimoto | |
| 5,584,007 A | * | 12/1996 | Ballard | 711/113 |
| 5,717,893 A | * | 2/1998 | Mattson | 711/129 |
| 5,761,727 A | * | 6/1998 | Wu et al. | |
| 5,764,945 A | * | 6/1998 | Ballard | 711/113 |
| 5,854,638 A | * | 12/1998 | Tung | |
| 5,860,158 A | * | 1/1999 | Pai et al. | |
| 5,875,464 A | * | 2/1999 | Kirk | 711/129 |
| 6,058,456 A | * | 5/2000 | Arimilli et al. | |
| 6,370,622 B1 | * | 4/2002 | Chiou et al. | 711/146 |

* cited by examiner

*Primary Examiner*—Tuan V. Thai
(74) *Attorney, Agent, or Firm*—Blakely, Sokoloff, Taylor & Zafman LLP

(57) ABSTRACT

A method and apparatus for cache replacement in a multiple variable-way associative cache is disclosed. The method according to the present techniques partitions a cache array dynamically based upon requests for memory from an integrated device having a plurality of processors.

16 Claims, 8 Drawing Sheets

METHOD AND APPARATUS FOR CACHE REPLACEMENT FOR A MULTIPLE VARIABLE-WAY ASSOCIATIVE CACHE

FIELD OF THE INVENTION

The present invention relates to the field of computer systems. In particular, the present invention relates to a method and apparatus for cache replacement in a multiple variable-way associative cache.

BACKGROUND OF THE INVENTION

Caches are commonly used to temporarily store values that might be repeatedly accessed by a processor, in order to speed up processing by avoiding the longer step of loading the values from main memory such as random access memory (RAM).

A cache has many "blocks" which individually store the various instructions and data values. The blocks in any cache are divided into groups of blocks called "sets." A set is the collection of cache blocks that a given memory block can reside in. For any given memory block, there is a unique set in the cache that the block can be mapped into, according to preset mapping functions. The number of blocks in a set is referred to as the associatively of the cache, e.g., 2-way set associative means that, for any given memory block there are two blocks in the cache that the memory block, can be mapped into; however, several different blocks in main memory can be mapped to any given set. A 1-way set associative cache is direct mapped; that is, there is only one cache block that can contain a particular memory block. A cache is said to be fully associative if a memory block can occupy any cache block, i.e., there is one set, and the address tag is the full address of the memory block.

An exemplary cache line (block) includes an address-tag field, a state-bit field, an inclusivity-bit field, and a value field for storing the actual instruction or data. The state-bit field and inclusivity-bit field are used to maintain cache coherency in a multiprocessor computer system. The address tag is a subset of the full address of the corresponding memory block. A compare match of an incoming effective address with one of the tags within the address-tag field indicates a cache "hit." The collection of all of the address tags in a cache (and sometimes the state-bit and inclusivity-bit fields) is referred to as a directory, and the collection of all of the value fields is the cache entry array.

When all of the blocks in a set for a given cache are full and that cache receives a request, with a different tag address, whether a "read" or "write," to a memory location that maps into the full set, the cache must "evict" one of the blocks currently in the set. The cache chooses a block by one of a number of means known to those skilled in the art (least recently used (LRU), random, pseudo-LRU, etc.) to be evicted. If the data in the chosen block is modified, that data is written to the next lowest level in the memory hierarchy which may be another cache (in the case of the L1 or on-board cache) or main memory (in the case of an L2 cache, as depicted in the two-level architecture of FIG. 1). By the principle of inclusion, the lower level of the hierarchy will already have a block available to hold the written modified data. However, if the data in the chosen block is not modified, the block is simply abandoned and not written to the next lowest level in the hierarchy. This process of removing a block from one level of the hierarchy is known as an "eviction." At the end of this process, the cache no longer holds a copy of the evicted block.

This ratio of available blocks for instruction versus data is not, however, always the most efficient usage of the cache for a particular procedure. Many software applications will perform better when run on a system with split I/D caching, while others perform better when run on a flat, unified cache (given the same total cache space). In the instances where the cache I/D ratio is not particularly close to the actual ratio of instruction and data cache operations, there are again a troubling number of evictions.

A cache replacement algorithm determines which cache block in a given set will be evicted. For example, an 8-way associative cache might use an LRU unit which examines a 7-bit field associated with the set.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION OF THE PREFERRED EMBODIMENT

Figure 1:
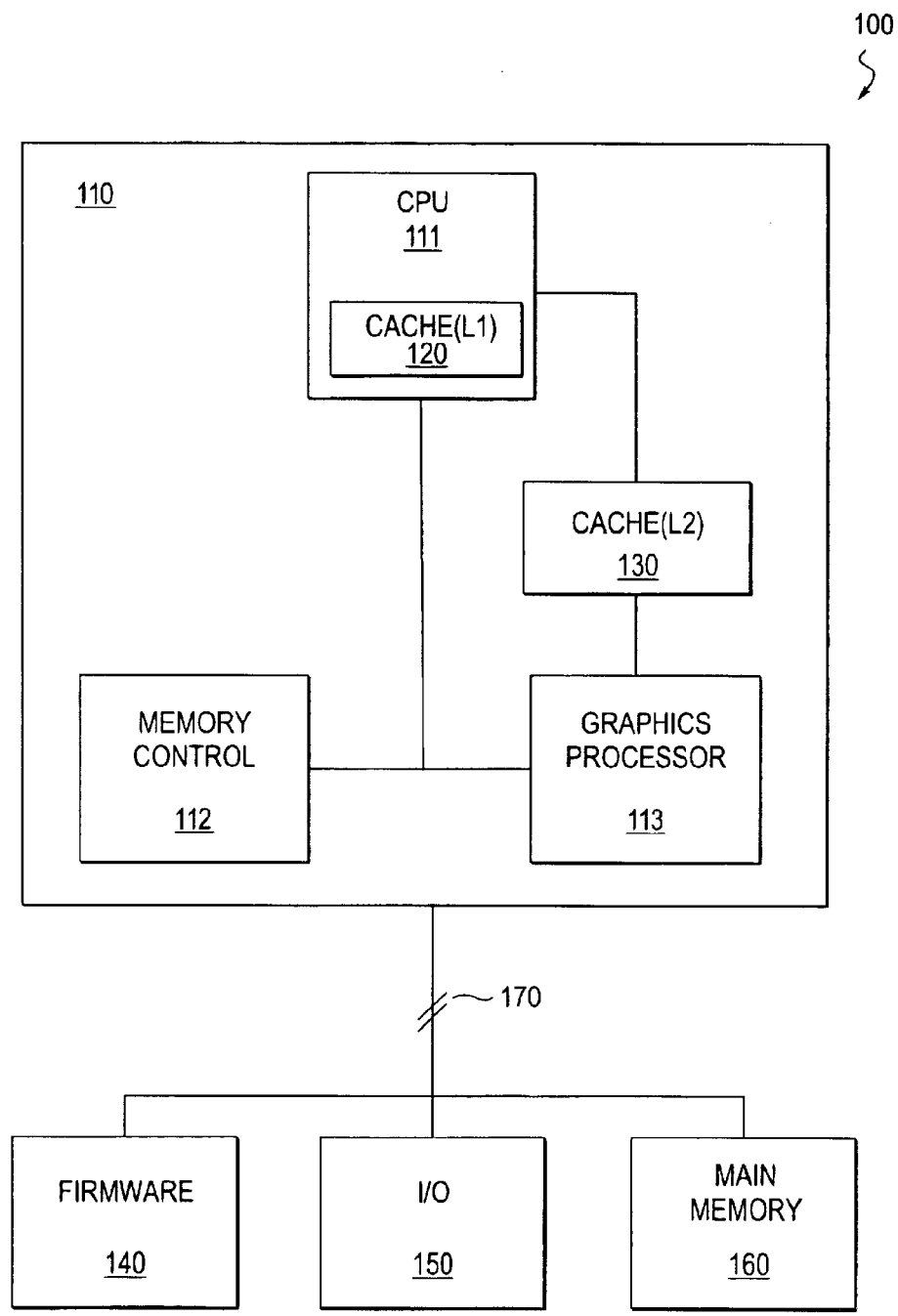
FIG. 1 illustrates an integrated multi-processor computer system.

A method and apparatus for cache replacement in a multiple variable-way associative cache. The method according to the present techniques partitions a cache array dynamically based upon requests for memory from an integrated device having a plurality of processors.

In the following description, for purposes of explanation, specific nomenclature is set forth to provide a thorough understanding of the present invention. However, it will be apparent to one skilled in the art that these specific details are not required in order to practice the present invention. For example, the present invention has been described with reference to documentary data. However, the same techniques can easily be applied to other types of data such as voice and video.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates an integrated multi-processor computer system. System 100 may have one or more processing units, such as Central Processing unit (CPU) 111 and graphics processor 113. CPU 111 and graphics processor 113 are integrated with memory controller 112 into integrated multi-processing device 110. Although described as fully integrated, device 110 could be broken into individual components in alternate embodiments.

Included in device 111 is level one cache 120 which is implemented using high speed memory devices. L1 cache 120 is a small on-board cache. In one embodiment the L1 cache 120 may be only 64 kilobytes. Connected to CPU 111 and graphics processor 113 is a level 2 cache 130. In one embodiment L2 cache 130 is considerably larger than L1 cache 120, and may be 512 kilobytes. L2 cache 130 supports L1 cache 120. Although FIG. 1 depicts only a two-level cache hierarchy, multi-level cache hierarchies can be provided where there are many levels of interconnected caches.

Multi-processor device 110 is connected to bus 170. Also connected to bus 170 are various peripheral devices, such as, input/output (I/O) devices 150 (i.e. a display monitor, keyboard, or permanent storage device), main memory devices 160 (i.e. random access memory (RAM), or firmware 140 (i.e. read only memory (ROM)). Firmware 140 is used to load operating systems, commands, and drivers for I/O devices 150. Memory devices 160 are used by the processors in device 110 to carry out program instructions. Memory controller 112 manages the transfer of data between the processor core and the cache memories, 120 and 130.

L2 cache 130 acts as an intermediary between main memory 160 and L1 cache 120, and has greater storage ability than L1 cache 120, but may have a slower access speed. Loading of data from main memory 160 into multi-processor device 110 goes through L2 cache 130. L2 cache 130 can be subdivided so that processors within device 110 may share L2 cache 130 resources, thus, allowing higher system performance for the same available memory bandwidth. For example, graphics processor 113 and CPU 111 may access L2 cache 130 simultaneously without degrading the bandwidth or latency of CPU 111. L2 cache 130 operates in two modes. In "non-sharing" mode, L2 cache 130 performs normally and dedicates all it resources to CPU 111. In "sharing" mode, L2 cache 130 dynamically partitions its resource based upon requests from multi-processor device 110. When in sharing mode, CPU 111 perceives one portion of the L2 cache 130, and graphics processor 113 perceives the remainder of the L2 cache 130. For example, in sharing mode when three dimensional graphics applications are run on multi-processor device 110, fifty percent of L2 cache 130 is allocated to CPU 111 and fifty percent of L2 cache 130 is allocated to graphics processor 113. Thus, the cache size allocated for graphics can potentially marginally degrade the performance of CPU 111.

Figure 2:
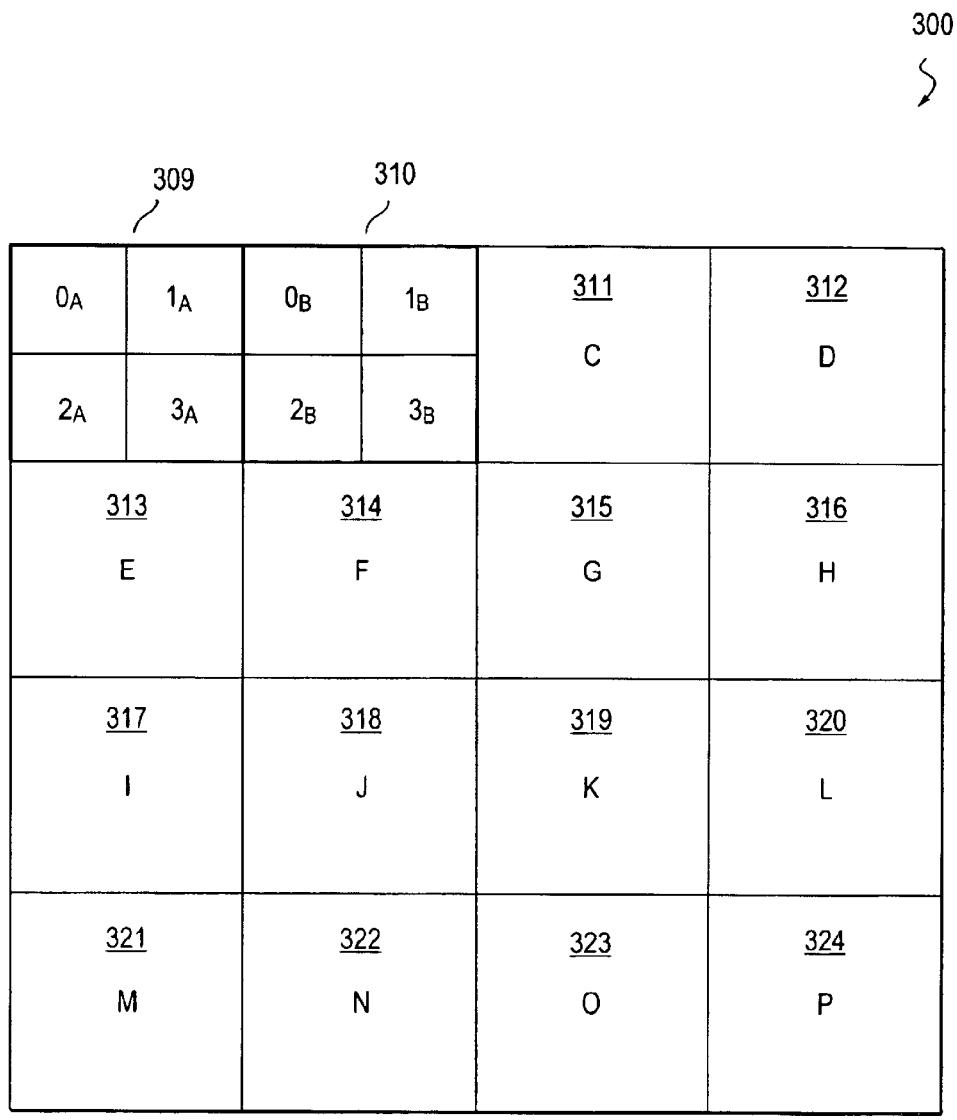
FIG. 2 illustrates a cache memory having a sharing mode and non sharing mode.

FIG. 2 illustrates a cache memory having a sharing mode and non sharing mode. Cache memory 300 is an 4-way set associative cache, having ways 0–3 and no sets (A–P) 309–324. In non-sharing mode all sets (A–P) 309–324 are allocated to CPU 111. In sharing mode, sets A–H 309–316 may be allocated to CPU 111, and sets I–P 317–324 may be allocated to graphics processor 113, in one embodiment. In another embodiment, each set could be partitioned. Thus, in sets A–P 309–324 ways 0–3 are divided. Thus ways $0_A$ and $1_A$ in set A 309 may be allocated to CPU 111, and ways $2_A$ and $3_A$ in set A 309 may be allocated to graphics processor 113. Similarly, sets B–P 310–324 would be divided.

Color, Z, and texture are examples of graphics request supported during cache sharing. In one embodiment, color and Z achieve improved system performance when used with direct-mapped caches. Texture improves system performance when used with multiple-way set associative caches.

Thus, way-subdivision and set-subdivision have just been described. Way subdivided means that for a cache of X sets and Y ways, X sets and Y minus U ways are used to store CPU 111 data, while X sets an U ways store graphics processor 113 data, when in sharing mode. Set subdivided means X minus V sets and Y ways are allocated for CPU 111 data, while V sets and Y ways are allocated for graphic processor 113 data, when in sharing mode. In one embodiment, X, V, Y, and U are numbers that are multiples of two.

In a way subdivided cache, the number of sets allocated for each request type (i.e. CPU, texture, Z or color) remains constant, while the number of ways decreases. For example, a cache with X sets and Y ways in sharing mode supports simultaneous requests of various types where half of the cache is allocated to CPU 111 transactions, one quarter of the cache 300 is allocated for texture transactions and one quarter of the cache 300 is allocated for color/Z. Consequently, X sets and Y/2 ways are allocated to CPU 111 transactions, X sets and Y/4 ways are allocated for texture transactions and X sets and Y/4 ways are allocated for color/Z transactions.

For example, FIGS. 3A–3D illustrate a way-subdivided cache in two different sharing modes, and non-sharing mode. FIG. 4A illustrates cache device 400 in non-sharing mode at time t0. Cache device 400 is an 8-way set associative cache with 2 sets (A,B) 401 and 409 and 8 ways $0_A$–$7_A$. All ways $0_A$–$7_A$ are allocated to CPU 111. FIG. 4B illustrates cache device 400 in sharing mode at time $t_1$. Cache device 400 is way subdivided and configured for three simultaneous accesses. Thus, set A 411 is a 4 way set associative cache having ways $0_A$–$3_A$. Set B 412 is a 2 way set associative cache having ways $0_B$ and $1_B$. Set C 413 is a 2 way set associative cache having ways $0_C$ and $1_C$. In one embodiment, Set A 411 is allocated for CPU 111 transactions, set B 412 is allocated for texture transactions, and set C 413 is allocated for color/Z transactions. The remainder 419 of the cache array 400 is way subdivided in a similar fashion.

Figure 4A:
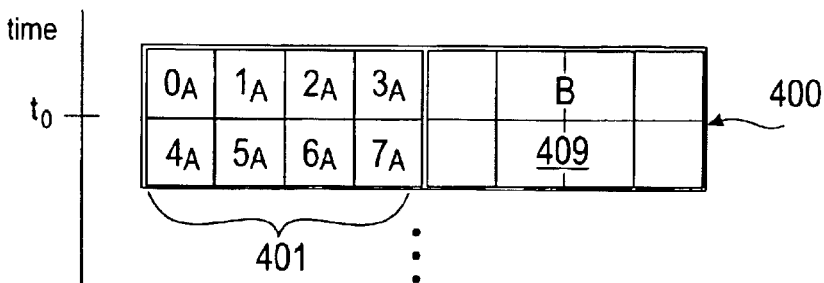
FIG. 4A illustrates cache device 400 in non-sharing mode at time t0.
Figure 4B:
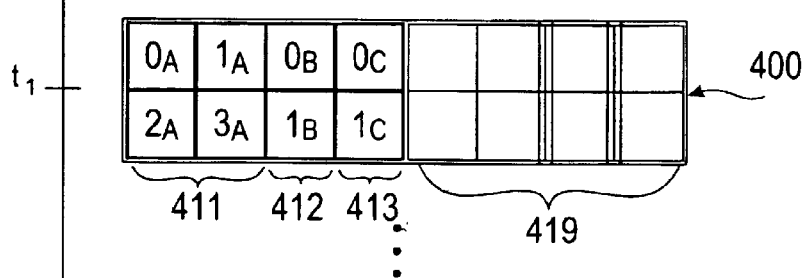
FIG. 4B illustrates cache device 400 in sharing mode at time $t_1$.
Figure 4C:
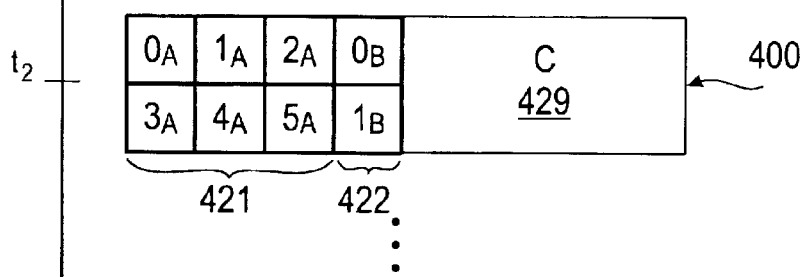
FIG. 4C illustrates cache device 400 in sharing mode at time $t_2$.

FIG. 4C illustrates cache device 400 in sharing mode at time $t_2$. Cache device 400 is way subdivided and configured for two simultaneous accesses. Thus, set A 421 is a 6-way set associative cache having ways $0_A$–$5_A$. Set B 422 is a 2 way set associative cache having ways $0_B$ and $1_B$. In one embodiment, set A 421 is allocated for CPU 111 transactions, and set B 422 is allocated for texture transactions. No ways are allocated for color/Z transactions. In another embodiment, Set A 421 is allocated for CPU 111 transactions, and Set B 422 is allocated for color/Z transactions. No ways are allocated for texture transactions. The remainder 429 of cache array 400 is way subdivided in a similar fashion.

Figure 4D:
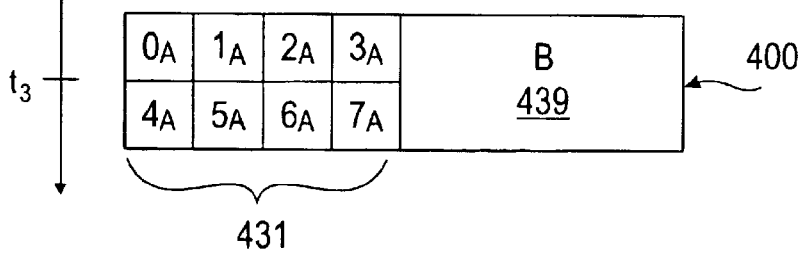
FIG. 4D illustrates cache device 400 in non-sharing mode at time $t_3$.

FIG. 4D illustrates cache device 400 in non-sharing mode at time $t_3$. Cache device 400 has returned to the non-sharing mode of FIG. 4A, as an 8-way set associative cache with set A 431 and B 439. All ways $0_A$–$7_A$ are allocated to CPU 111 as well.

Although described with respect to way subdivision, cache device 400 could be set subdivided in alternate embodiments.

Table 1 shows different configurations and the resulting number of ways and sets in sharing mode for a cache with X sets and Y ways. It is assumed three simultaneous transactions; therefore, each configuration has three numbers representing the cache size allocated to each request type. For example, ½-¼-¼ means that in sharing mode, ½ of the cache is used to store CPU data, ¼ for texture data and the last ¼ for color/Z data. When not in sharing mode, the whole cache is allocated to CPU transactions.

TABLE 1 number of sets and ways allocated to each request type for different configurations

| | | CONFIGURATION | | | |
|---|---|---|---|---|---|
| | | 1 - 0 - 0 (not sharing mode) | ½ - ¼ - ¼ (sharing mode) | ¾ - ¼ - 0 (sharing mode) | ¾ - 0 - ¼ (sharing mode) |
| Way sub-division | CPU-X sets, Y ways Texture: 0 Color/Z: 0 | CPU: X sets. Y/2 ways Texture: X sets, Y/4 ways Color/Z: X sets, Y/4 ways | CPU: X sets, 3Y/4 ways Texture: X sets, Y/4 ways Color/Z: 0 | CPU: X sets, 3Y/4 ways Texture: 0 Color/Z: X sets, Y/4 ways |
| Set sub-division | CPU: X sets, Y ways Texture: 0 Color/Z: 0 | CPU: X/2 sets, Y ways Texture: X/4 sets, Y ways Color/Z: X/4 sets, Y ways | CPU: 3X/4 sets, Y ways Texture: X/4 sets, Y ways Color/Z: 0 | CPU: 3X/4 sets, Y ways Texture: 0 Color/Z: X/4 sets, Y ways |

As shown in Table 1, when using way subdivision, CPU way associativity decreases in sharing mode; i.e., number of ways in the cache portion allocated to CPU transaction in sharing mode is less than way associativity in non-sharing mode. On the other hand, using set subdivision, way associativity can be maintained constant in sharing mode with no LRU array growth and minimal die size impact.

Table 2 shows the resulting cache sizes and pseudo-LRU algorithms after switching to sharing mode for three different configurations. Three simultaneous accesses; i.e., CPU, texture and color/Z, are assumed in sharing mode.

FIG. 2 for higher associativity caches; i.e., starting from a non-sharing, mode 16-way set associative cache with 15 LRU bits per cache set, 32-way set associative cache with 31 LRU bits per cache set . . . .

The technique used in table 2 to support multiple LRU algorithms on a way subdivided shared cache works best

TABLE 2

| | | CONFIGURATION | | | |
|---|---|---|---|---|---|
| | | 1 - 0 - 0 (not sharing mode) | ½ - ¼ - ¼ (sharing mode) | ¾ - 0 - ¼ (sharing mode) | ¾ - ⅛ - ⅛ (sharing mode) |
| Set sub-division | CPU | X sets, 8 ways | X/2 sets, 8 ways | 3X/4 sets, 8 ways | 3X/4 sets, 8 ways |
| | Texture | 0 | X/4 sets, 8 ways | 0 | X/8 sets, 8 ways |
| | Color/Z | 0 | X/4 sets, 8 ways | X/4 sets, 8 ways | X/8 sets, 8 ways |
| Way sub-division | CPU | X sets, 8 ways | X sets, 4 ways L0 = 0 L2, L5 and L6 unused | X sets, 6 ways L2 = 0 L6 unused | X sets, 6 ways L2 = 0 L6 unused |
| | Texture | | 0 | X sets, 2 ways Use L5 | 0 | X sets, 1 way No LAU |
| | Color/Z | | 0 | X sets, 2 ways Use L6 | X sets, 2 ways Use L6 | X sets, 1 way No LRU |

As shown in Table 2, when using set subdivision in sharing mode, the number of ways allocated to each request type is constant (i.e., it is always 8 ways, regardless of whether the cache is in sharing mode). Therefore, the same LRU algorithm as when not in sharing mode can be used. When using way subdivision, the number of sets remains constant. Consequently, in sharing mode, a single LRU array has to support several pseudo-LRU algorithms.

Figure 3:
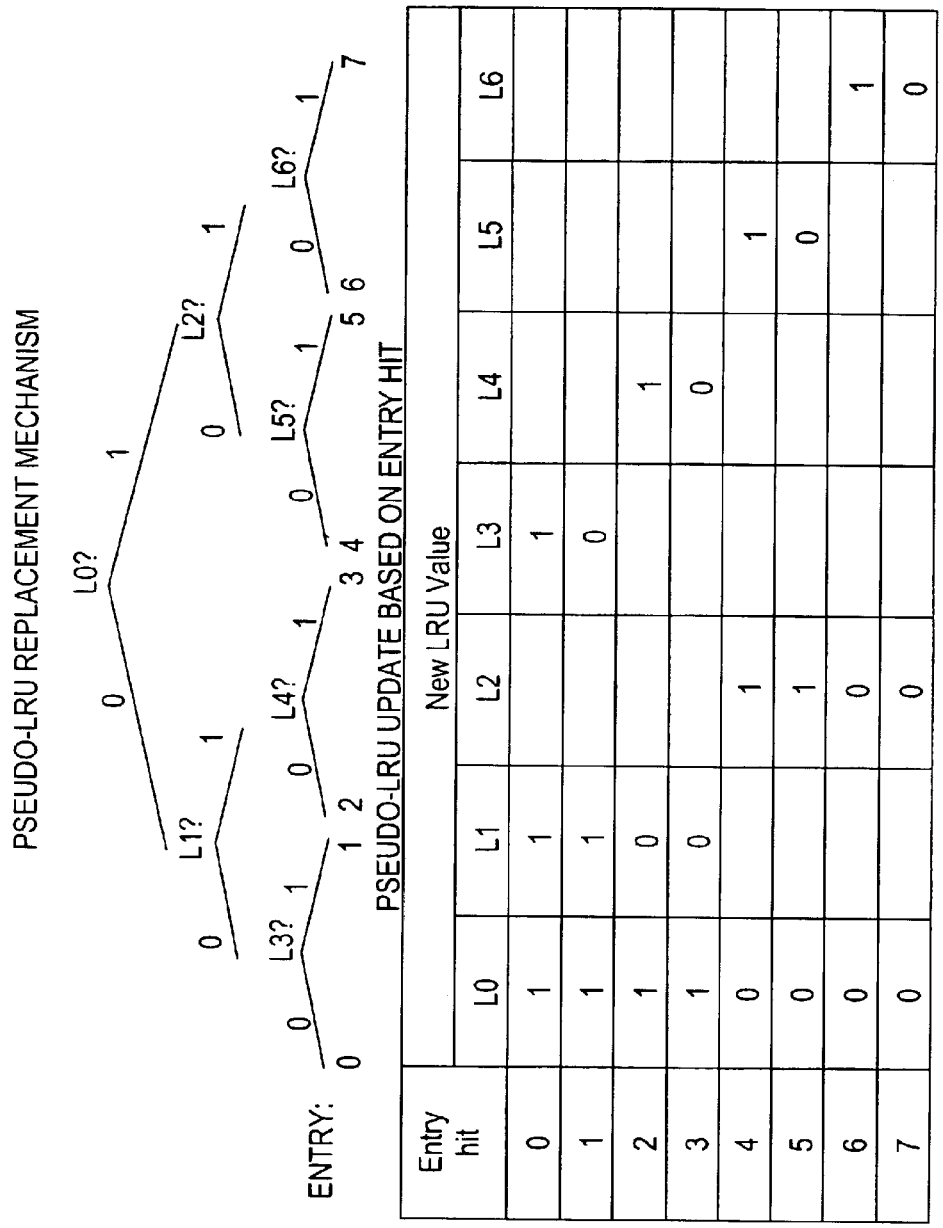
FIG. 3 illustrates a pseudo-LRU algorithm for an 8-way set associative cache.

FIG. 3 illustrates a pseudo-LRU algorithm for an 8-way set associative cache. Given an 8-way set associative cache as described in Table 2, which uses a pseudo-LRU replacement algorithm, such as that shown in FIG. 3, when switching to sharing mode using way subdivision, in configuration ½-¼-¼, the LRU bit L0 is hard-coded to 0 for every cache set. CPU requests have now a 4-way set associative cache, and they use similar LRU algorithms as described herein, but only with LRU bits L1, L3 and L4. Texture and color/Z requests are stored in a 2-way set associative cache each. They use LRU bits L5 and L6, respectively. LRU bit L2 is unused in sharing mode. For a 2-way set associative cache, hits to way 0 set the LRU bit value to 1, and hits to way 1 clear the LRU bit value to 0.

Similarly, the LRU bit L2 is hardcoded to 0 for every cache set, when switching to sharing mode using way subdivision in configuration ¾-0-¼. CPU requests use LRU bits L0, L1, L3, L4, and L5 in a 6-way set associative cache. LRU bit L6 is used for a 2-way set associative color/Z cache. Texture requests are not cached. There is no change as far as CPU requests is concerned for configuration ¾-⅛-⅛. In the latter configuration, texture and color/Z are direct-mapped; therefore, no LRU is needed, and LRU bit L6 is unused in sharing mode.

By making the corresponding logic and circuit changes, not only multiple requests, but also multiple configurations can be supported with the existing LRU cache array used to support CPU cache accesses when not in sharing mode. Other configurations aside from those shown in Table 2 can be similarly implemented. Multiple LRU algorithms can also be supported using the same technique described in when the ways allocated to each request type in sharing mode is a power of two. In a way subdivided cache, the LRU algorithm for CPU requests in sharing mode in the configuration ¾-0-¼ can be improved for better performance. LRU bit L2 remains hardcoded for every cache set, when in sharing mode. The combination LOL1=11 is illegal in sharing mode. LRU bit L6 is still used for a 2-way set associative cache for color/Z request, when in sharing mode.

In one embodiment, cache device 400 uses the following multiple pseudo-LRU update mechanism for an 8-way set associative cache with seven LRU bits per cache set. The update mechanism indicates which way of a given set will be replaced upon a cache miss to that particular set. A cache miss occurs when data sought by CPU 111 or graphics processor 113 is not already in the L2 cache, 130 or L1 cache 120 but instead needs to be extracted from main memory 160. Once extracted from main memory 160, the update mechanism determines cohere to place the data within cache 130 according to an 8-bit code indicating the least recently used (LRU) ways.

For example, suppose cache 400 is operating in sharing mode with ¾ of cache 400 for CPU transactions, and ¼ of cache 400 for color/Z transactions with no caching of texture data. Thus, the 8-way set associative cache is transformed into a 6-way set associative cache for CPU 111 transactions and a 2-way set associative cache for color/Z transactions from graphics processor 113.

TABLE 3

| | New LRU Values | | | | | | | |
|---|---|---|---|---|---|---|---|---|
| Entry Hit | L0 | L1 | L2 | L3 | L4 | L5 | L6 | Replaced Way |
| update 0 | 0 0 | 0 1 | 0 | 0 1 | 0 | 0 | 0 | = 0 |
| update 2 | 0 1 | 1 0 | 0 | 1 | 0 1 | 0 | 0 | = 2 |

TABLE 3-continued

| Entry Hit | New LRU Values | | | | | | | Replaced Way |
|---|---|---|---|---|---|---|---|---|
| | L0 | L1 | L2 | L3 | L4 | L5 | L6 | |
| | 1 | 0 | 0 | 1 | 1 | 0 | 0 | = 4 |
| update 4 | 0 | 0 | | | | 1 | | |
| | 0 | 0 | 0 | 1 | 1 | 1 | 0 | = 1 |
| update 1 | 0 | 1 | | 1 | | | | |
| | 0 | 1 | 0 | 1 | 1 | 1 | 0 | = 3 |
| update 3 | 1 | 0 | | | 0 | | | |
| | 1 | 0 | 0 | 1 | 0 | 1 | 0 | = 5 |
| update 5 | 0 | 0 | | | | 0 | | |
| | 0 | 0 | 0 | 1 | 0 | 0 | 0 | = 1 |
| update 1 | 0 | 1 | | 1 | | | | |
| | 0 | 1 | 0 | 1 | 0 | 0 | 0 | = 2 |
| update 2 | 1 | 0 | | | 1 | | | |
| | 1 | 0 | 0 | 1 | 1 | 0 | 0 | = 4 |
| update 4 | 0 | 0 | | | | 1 | | |
| | 0 | 0 | 0 | 1 | 1 | 1 | 0 | = 0 |
| update 0 | 0 | 1 | | 1 | | | | |
| | 0 | 1 | 0 | 1 | 1 | 1 | 0 | = 3 |
| update 3 | 1 | 0 | | | 0 | | | |
| | 1 | 0 | 0 | 1 | 0 | 1 | 0 | = 5 |
| update 5 | 0 | 0 | | | | 0 | | |
| | 0 | 0 | 0 | 1 | 0 | 0 | 0 | = 1 |
| update 1 | 0 | 1 | | 1 | | | | |
| | 0 | 1 | 0 | 1 | 0 | 0 | 0 | = 2 |

Figure 5:
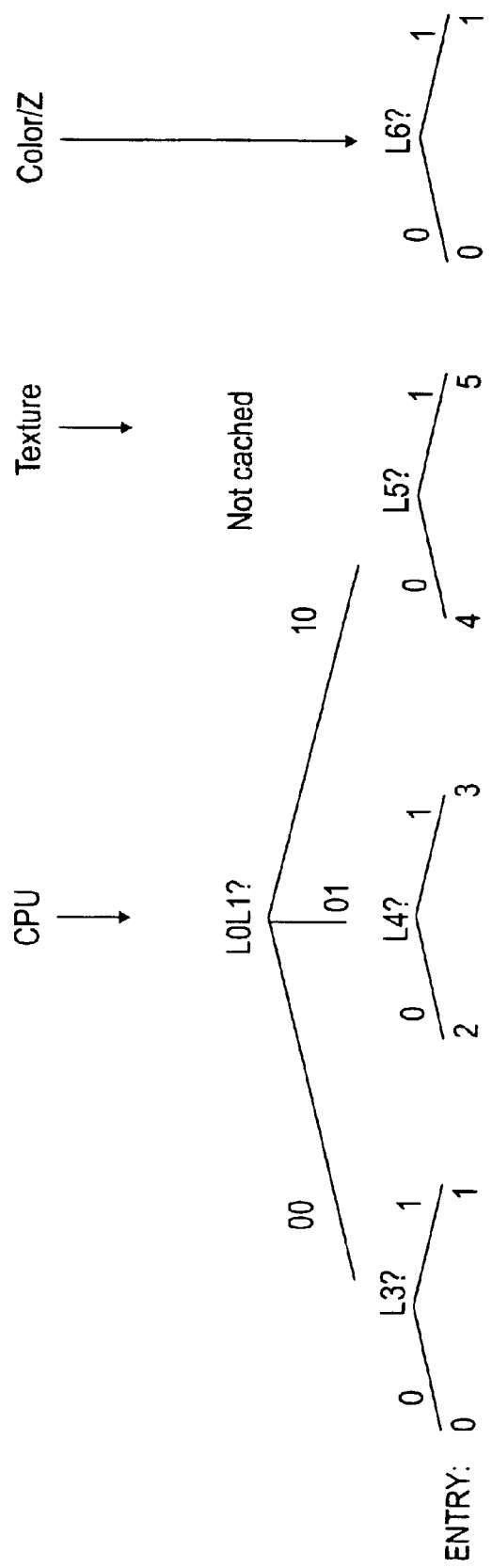
FIG. 5 illustrates a multiple pseudo-LRU replacement mechanism for an 8-way cache way subdivided into 6-way and 2-way set associativities.

FIG. 5 illustrates a multiple pseudo-LRU replacement mechanism, corresponding to the cache sharing mode described in the previous paragraph. LRU bit L2 is never used. LRU bit L6 is only used for color/Z transactions. On CPU transactions, the 7-bit LRU algorithm is reduced to a 5-bit LRU algorithm (LRU bits L0, L1, L3, L4, and L5). Table 3 shows how CPU transactions update the LRU entries. Line 1 of table 3 shows that all LRU bits begin having the value 0. Looking at FIG. 5, one sees that LRU code 00000000 hit on way 0. Once way 0 is hit, the LRU code is updated as shown in line 2 of table 3, that shows LRU bit 0 (L0) becomes 0, L1 becomes 1 and L3 become 1. The resulting 7-bit LRU code is 0101000. Referring to FIG. 5, one can see that the LRU replacement mechanism directs cache 400 to store the data in way 2. The LRU bits are updated as shown in the table 3. The remaining ways are replaced according to table 3 and FIG. 5 as described above.

Cache 400 may also be dynamically converted into a direct-mapped cache. Some graphics transactions, such as color/Z, achieve improved performance using a direct mapped cache. Regardless of whether way or set subdivision is used, and based on the cache size allocated to a particular transaction, the initial partitioning may not yield a direct-mapped cache for the particular transaction, and further conversion may be required to go to direct-mapped when in sharing mode.

An exemplary cache line relating the physical address of a memory cell in cache 400 consists of a tag address, a set address, and a byte offset. In one embodiment, an n-way set associative cache is direct mapped by (for N equals 2 to the power M), by expanding the set address by M bits and decreasing the tag portion of the address by M bits. The M least significant bits of the tag become the most significant bits of the set address.

Figure 6:
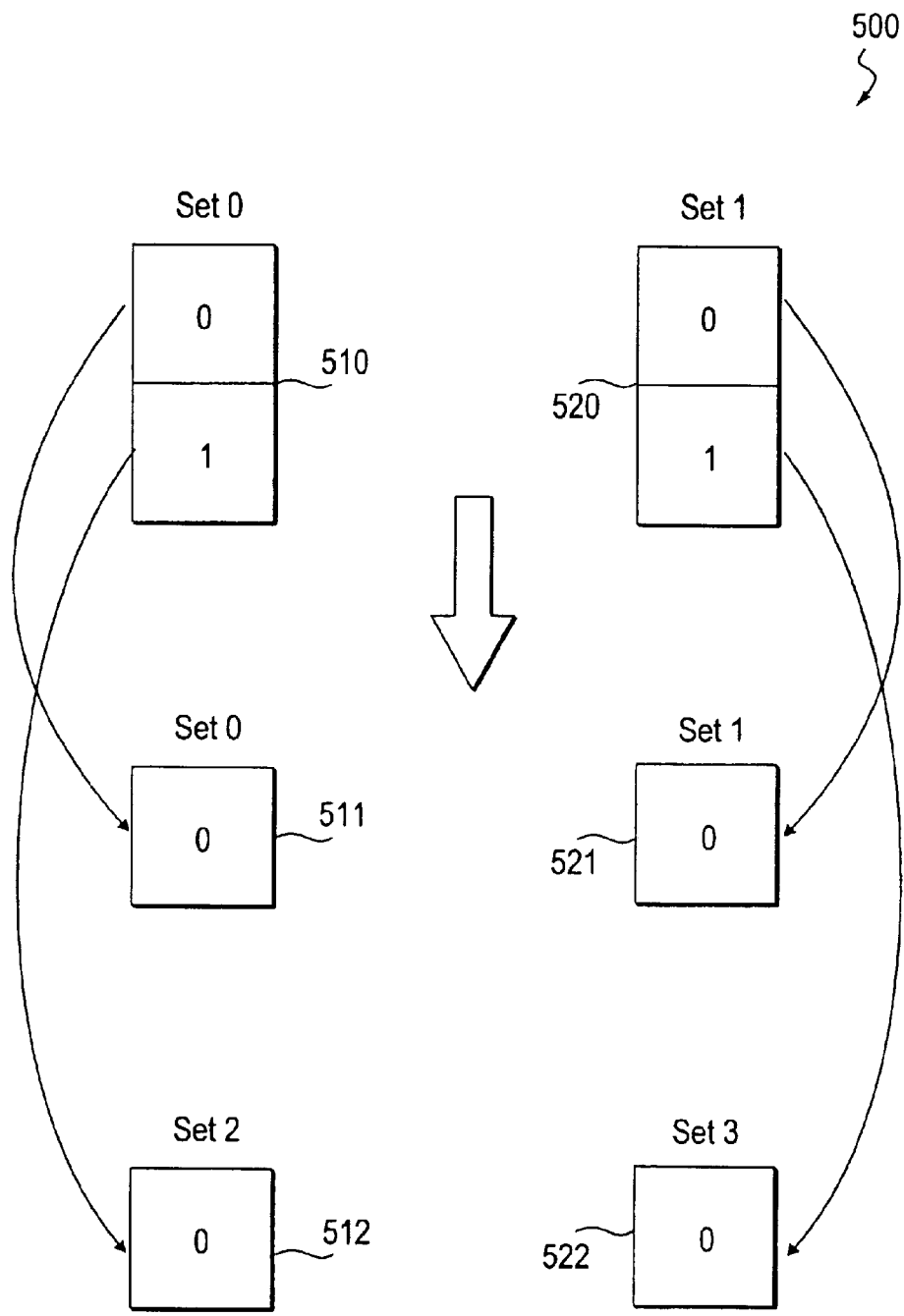
FIG. 6 illustrates transforming an N-way set associative cache to a direct mapped cache.

FIG. 6 illustrates transforming N-way set associative caches to a direct mapped cache. A 1-way set associative cache is direct mapped; that is, there is only one cache block that can contain a particular memory block. Cache device 500 is a 2-way set associative cache shown with 2 sets. Set 0 510 and set 1 520 are transformed into direct mapped caches with only one set. The number of sets doubles. LRU bits are meaningless since there is only one possible way to be mapped. Thus, way 0 of set 0 510 becomes set 0 511 having a single way 0. Similarly, way 1 of set 0 510 becomes set 2 512 having a single way 0, as well. Set 1 520 is unwrapped the same way as set 0 510.

Figure 7:
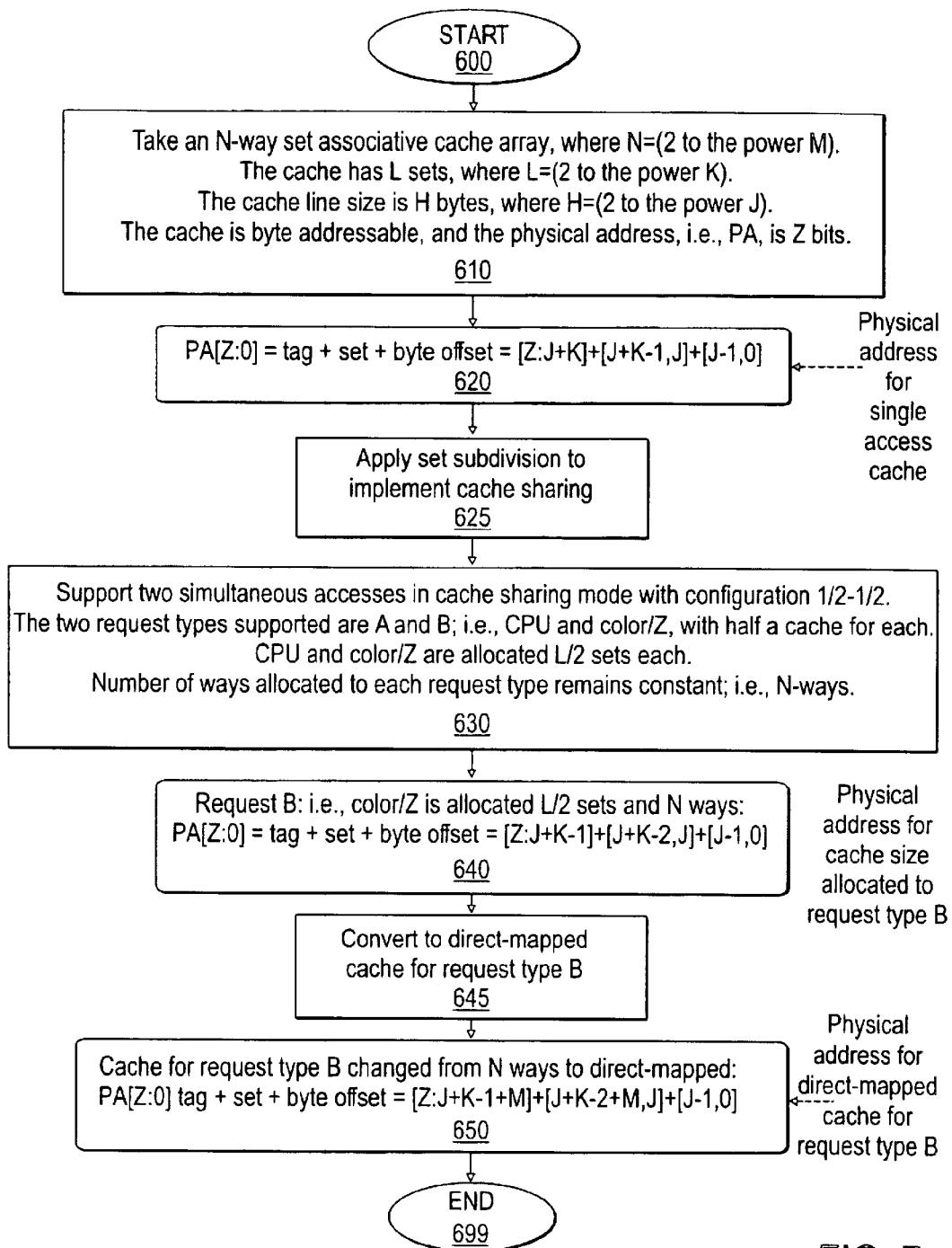
FIG. 7 illustrates a flow diagram of converting an N-way set associative cache into a direct mapped cache.

FIG. 7 illustrates a flow diagram of converting an N-way set associative cache into a direct mapped cache. The process begins in block 600. In processing block 610, an N-way set associative cache array where N=(2 to the power M) is selected to be converted. The cache array has L sets, where L=(2 to the power K). The cache line size is H bytes, where H=(2 to the power J). The cache is byte addressable, with a physical address (PA) of Z bits.

In processing block 620, the physical address for a single access cache is defined to have three components, a tag address, a set address, and a byte offset. Bits Z to J+K are the tag address, bits J+K−1 to J are the set address, and bits J−1 to 0 are the byte offset. Set subdivision is applied as described above to implement cache sharing, in processing block 625. In processing block 630, cache device supports two simultaneous accesses in cache sharing mode configured to split the cache equally. For example, CPU 111 and color/Z are allocated L/2 sets each. The number of ways allocated to each request type remains constant. In processing block 640, the physical address for the cache portion allocated to color/Z requests are defined as with bits Z to J+K−1 are the tag address bits, bits J+K−2 to J are the set address, and bits J−1 to 0 are the byte offset. In processing block 645, color/Z requests are converted to direct-mapped cache. In processing block 650, the physical address for the direct mapped cache portion allocated to color/Z requests are defined as with bits Z to J+K−1+M are the tag address bits, bits J+K−2+M to J are the set address, and bits J−1 to 0 are the byte offset. The process ends in block 699. In summary, when converting from N-way set associative to a direct-mapped cache, the set address expands by M bits. The most significant M bits of the set address decode N ways. For example, to convert a 2-way set associative cache to direct mapped, M=1 for a 4-way, and M=2 for an 8-way.

TABLE 4

| Entry Hit | NEW LRU Value | | | |
|---|---|---|---|---|
| | MSB | L1 | L2 | L3 |
| 0 | 1 | 1 | 1 | |
| 1 | 1 | 1 | 0 | |
| 2 | 1 | 0 | | 1 |
| 3 | 1 | 0 | | 0 |

TABLE 4-continued

| Entry | NEW LRU Value | | | |
|---|---|---|---|---|
| Hit | MSB | L1 | L2 | L3 |
| 4 | 0 | 1 | 1 | |
| 5 | 0 | 1 | 0 | |
| 6 | 0 | 0 | | 1 |
| 7 | 0 | 0 | | 0 |

Figure 8:
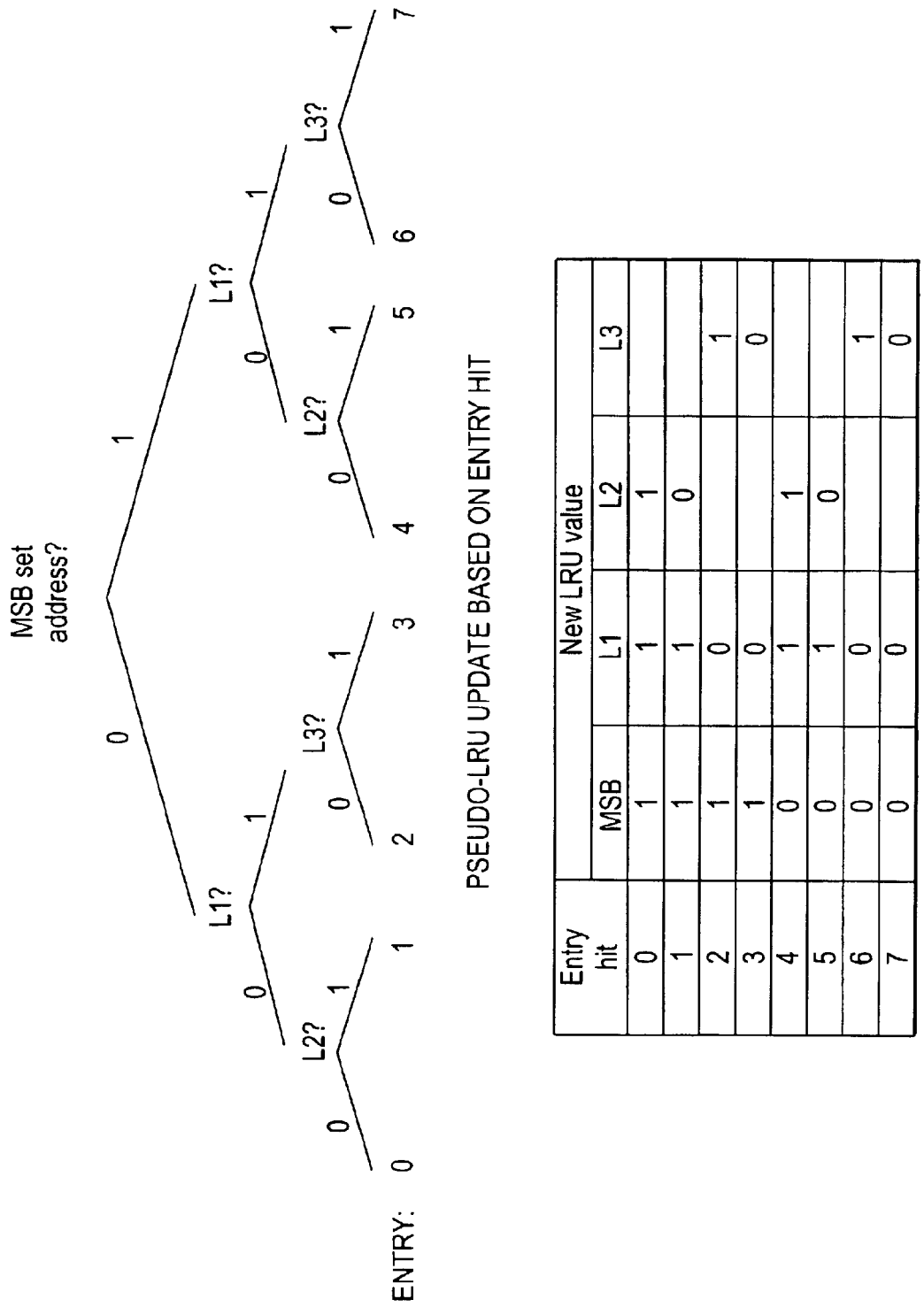
FIG. 8 illustrates a pseudo-LRU mechanism for converting to an 8-way set associative cache from a 4-way set associative cache.

Table 4 shows a pseudo-LRU method to achieve an 8-way set associative cache developed from a 4-way set associative cache with 3 LRU bits. The MSB set address bit is the most significant bit of the set address of the 4-way set associative cache. This technique may be applied to convert any cache to a higher degree of set associativity. FIG. 8 illustrates the pseudo-LRU mechanism for converting to an 8-way set associative cache from a 4-way set associative cache. FIG. 8 is used to determine the entry hits as described above with reference to FIG. 5.

A method and device for cache replacement in a multiple variable-way associative cache is disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

We claim:

1. A method, comprising:
   dynamically partitioning an N-way set associative cache array in a sharing mode at a first time based upon requests for memory from an integrated device having a plurality of processors, wherein the integrated device includes a graphics processor and a central processing unit; and
   dynamically un-partitioning the N-way set associative cache array not in the sharing mode at a second time.

2. The method as claimed in claim 1, further comprising subdividing one or more ways within the cache array.

3. The method as claimed in claim 1, further comprising subdividing one or more sets within the cache array.

4. The method as claimed in claim 1, further comprising using a single least recently used array to replace ways.

5. The method as claimed in claim 1, further comprising applying a multiple pseudo least recently used update based on an entry hit.

6. The method as claimed in claim 1, further comprising dynamically partitioning the cache array into a direct-mapped cache.

7. A device comprising:
   an N-way set associative cache memory array dynamically partitioned at a first time when multiple memory requests are received from an integrated device having a plurality of processors,
   wherein the N-way set associative cache array is configured to be dynamically un-partitioned at a second time, and
   wherein the integrated device includes a graphics processor and a central processing unit.

8. The device as claimed in claim 7 further comprising:
   an integrated device having a plurality of processors connected to the cache memory array.

9. The device as claimed in claim 8 wherein the integrated device includes a graphics processor and a central processing unit.

10. The device as claimed in claim 7 further comprising a main memory device connected to the cache memory array.

11. A computer-readable medium having stored thereon a plurality of instructions, said plurality of instructions when executed by a computer, cause said computer to perform the method of:
   dynamically partitioning an N-way set associative cache array at a first time based upon requests for memory from an integrated device having a plurality of processors, wherein the integrated device includes a graphics processor and a central processing unit; and
   dynamically un-partitioning the N-way set associative cache array at a second time.

12. The computer-readable medium of claim 11 having stored thereon additional instructions, said additional instructions when executed by a computer, cause said computer to further perform the method of subdividing one or more ways within the cache array.

13. The computer-readable medium of claim 11 having stored thereon additional instructions, said additional instructions when executed by a computer, cause said computer to further perform the method of subdividing one or more sets within the cache array.

14. The computer-readable medium of claim 11 having stored thereon-additional instructions, said additional instructions when executed by a computer, cause said computer to further perform the method of using a single least recently used array to replace ways.

15. The computer-readable medium of claim 11 having stored thereon-additional instructions, said additional instructions when executed by a computer, cause said computer to further perform the method of applying a multiple pseudo least recently used update based on an entry hit.

16. The computer-readable medium of claim 11 having stored thereon-additional instructions, said additional instructions when executed by a computer, cause said computer to further perform the method of dynamically partitioning the cache array into a direct-mapped cache.

* * * * *

UNITED STATES PATENT AND TRADEMARK OFFICE
CERTIFICATE OF CORRECTION

| | |
|---|---|
| PATENT NO. | : 6,889,291 B1 |
| APPLICATION NO. | : 09/608507 |
| DATED | : May 3, 2005 |
| INVENTOR(S) | : Palanca et al. |

Page 1 of 1

It is certified that error appears in the above-identified patent and that said Letters Patent is hereby corrected as shown below:

In column 12, at line 35, delete "13. The computer-readable medium of claim 11 having stored thereon additional instructions, said additional instructions when executed by a computer, cause said computer to further perform the method of subdividing one or more sets within the cache array."

Signed and Sealed this

Thirteenth Day of May, 2008

JON W. DUDAS
*Director of the United States Patent and Trademark Office*